Figure 6:
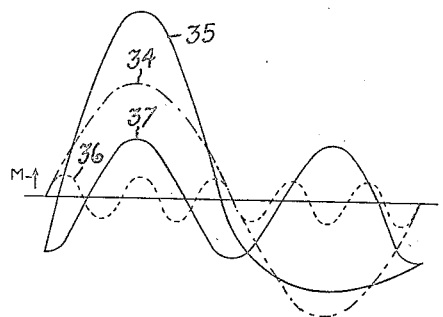

Oct. 30, 1945.    H. D. MIDDEL    2,388,070
ELECTROMAGNETIC APPARATUS
Filed Aug. 22, 1941    2 Sheets—Sheet 1
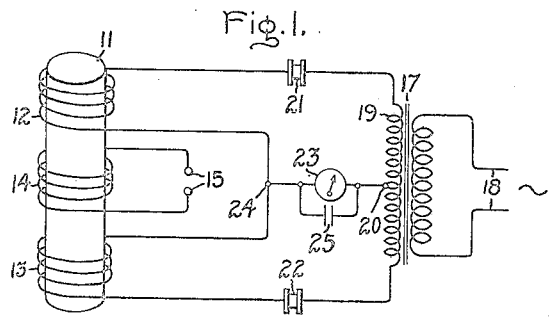
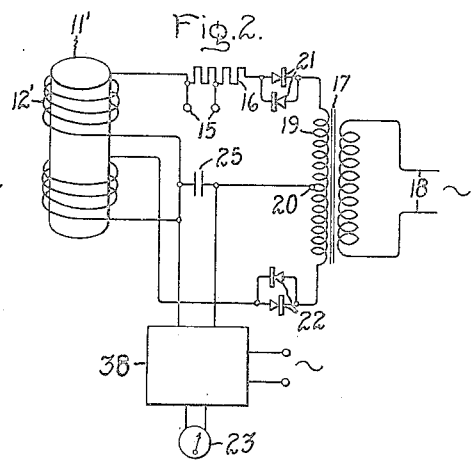
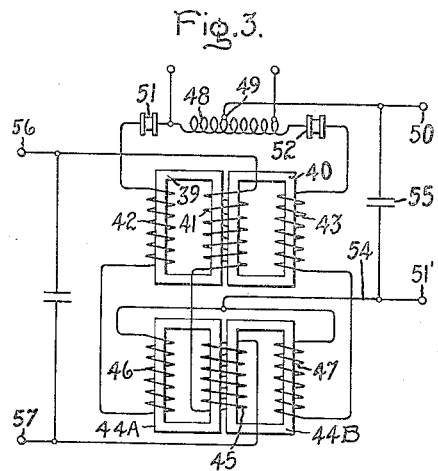
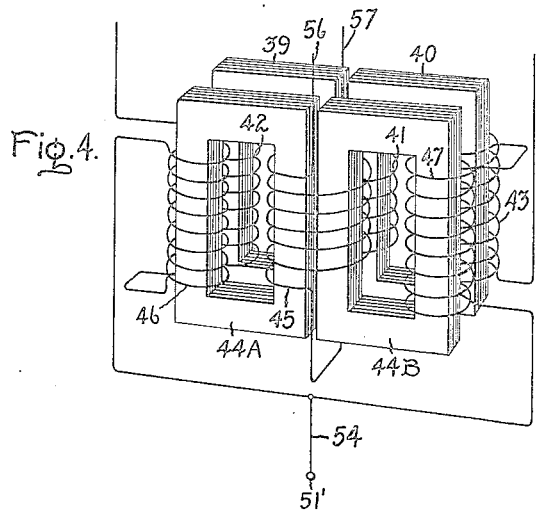
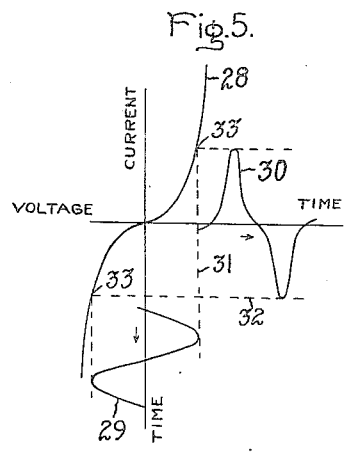
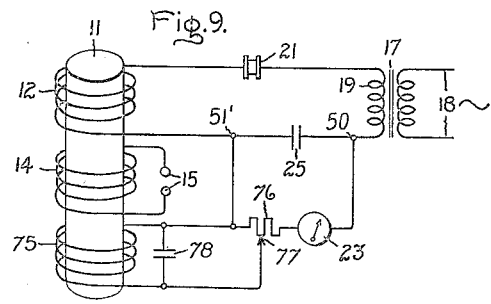
Inventor:
Hendrik D. Middel,
by Harry E. Dunham
His Attorney.

Patented Oct. 30, 1945

2,388,070

UNITED STATES PATENT OFFICE 2,388,070

ELECTROMAGNETIC APPARATUS

Hendrik D. Middel, Schenectady, N. Y., assignor to General Electric Company, a corporation of New York Application August 22, 1941, Serial No. 407,961

5 Claims. (Cl. 179—171)

My invention relates to an electro-responsive arrangement, and particularly to highly sensitive apparatus and methods for measuring, detecting and producing responses to minute unidirectional and low frequency alternating electric currents or magnetic fluxes and minute changes therein.

It is an object of my invention to produce a high gain, accurate and extremely stable amplifier for direct current and for low frequency alternating currents.

A further object is to provide non-electronic apparatus to obtain sensitivity and amplification, particularly for cases where currents measured are of the order of photoelectric, thermoelectric, and ionization currents.

Another object of the invention is to provide arrangements suitable in the field of thermoelectric, photoelectric, and ionization measurements, but my invention is not limited to the low-current field.

It is also an object of my invention to provide arrangements permitting the replacement of delicate galvanometers by more sturdy deflecting-pointer indicating instruments, for example, in the measurement of ionization currents of the primary X-ray beam in deep therapy equipment.

An additional object of my invention is to provide an arrangement for the operation of a comparatively strong relay by a comparatively low power output device such as a blocking-layer type light-sensitive cell interposing only a single stage amplifier.

Other and further objects will become apparent as the description proceeds.

In carrying out my invention for producing high amplification with great stability of very minute direct currents, even with low input impedances, I provide one or more stages of amplification each consisting of electro-magnetic induction units having highly permeably magnetic cores and having both alternating current and direct current windings, i. e., exciting windings and input windings, respectively. The arrangement is such that the polarizing flux produced by the direct current input passing through the input winding causes a second harmonic of alternating current to appear in the alternating-current exciting windings which are energized with current of suitable frequency. Non-linear resistance elements are interposed in the alternating-current circuits in series circuit relationship with direct-current output terminals. The direct-current output terminals are connected to the input windings of the next stage and alternating-current by-pass condensers may be connected across these terminals. A direct-current responsive device, such as a deflecting instrument, recorder, relay or the like is connected to the output terminals of the last amplifier stage. The unidirectional magnetization of the core material of each stage produced by the input winding causes an asymmetrical voltage to act across the non-linear resistor connected in the alternating current circuit of each stage. The distortion of symmetry produced by a minute unidirectional input current acting preferably through a large number of turns causes the non-linear resistor material to act as a rectifier introducing a direct current component in the output many times the magnitude of the direct current flowing in the input winding.

A better understanding of the invention will be afforded by the following detailed description considered in connection with the accompanying drawings and those features of the invention which are novel and patentable will be pointed out in the claims appended hereto.

Figure 7:
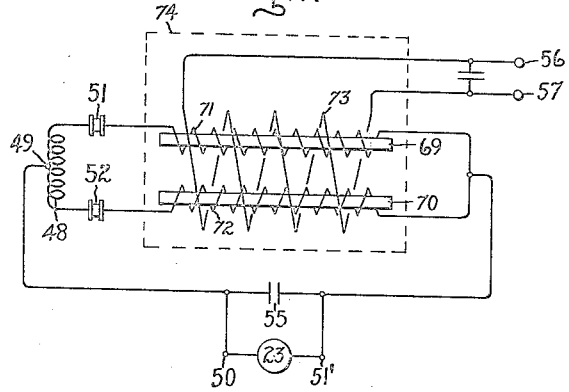
Figure 8:
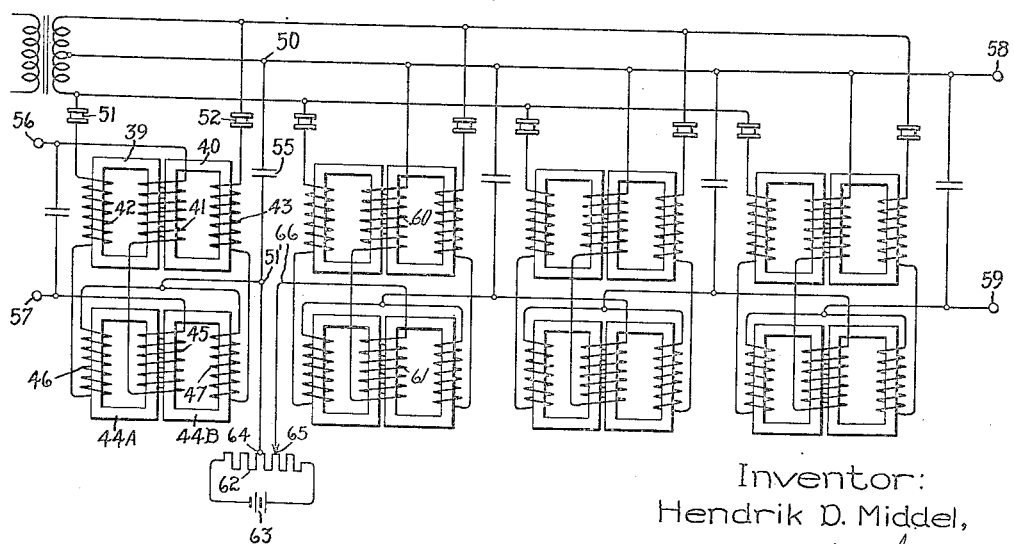

In the drawings Fig. 1 is a schematic representation of an amplifying system forming one embodiment of my invention showing the electric circuit diagram thereof; Fig. 2 is a schematic representation with an electric circuit diagram of a modification of the apparatus of Fig. 1; Fig. 3 is a circuit diagram schematically representing one stage of a direct-current and low-frequency A. C. amplifier forming another embodiment of my invention; Fig. 4 is a perspective view of the electromagnetic induction unit schematically represented in Fig. 3; Fig. 5 is a graph representing the current voltage relationship of non-linear resistor material; Fig. 6 is a graph representing in simplified form the introduction of even harmonics and asymmetry in wave form by the action of a unidirectional or polarizing flux; Fig. 7 is a schematic diagram of another embodiment of my invention; Fig. 8 is a circuit diagram of a four-stage amplifier employing units of the type represented in Figs. 3 and 4, and Fig. 9 is a schematic diagram of a form of my invention having a feed-back connection.

Like reference characters are used throughout the drawings to designate like parts.

In the form of amplifier illustrated by way of example in Fig. 1, there is a core 11 of permeable saturable magnetic material carrying a pair of alternating-current electric exciting windings 12 and 13 and an input winding 14. A direct current or voltage 15, or a low-frequency alternating current or voltage which is to be amplified is connected to the winding 14. For energizing the windings 12 and 13 there is an alternating current source which may take the form of a step-down transformer 17 which may be connected to a commercial alternating-current supply line 18. A transformer secondary winding 19 has a mid tap 20. The alternating-current impedance windings 12 and 13 are connected between the mid-tap and the respective ends of the secondary winding 19. Resistors or resistance units 21 and 22 composed of non-linear resistance material are connected in series with each of the alternating-current impedance windings, and a direct-current responsive device such as a deflecting instrument 23 is connected between the mid tap 20 of the transformer secondary and the common terminal 24 of the alternating current windings 12 and 13. For by-passing alternating-current components around the direct current instrument 23, a condenser 25 may be connected across the instrument 23. If the quantity to be amplified is a low-frequency alternating quantity the instrument may be in the form of a center-zero instrument in order to indicate from instant to instant the direction as well as the instantaneous magnitude of the current in the input coil 14.

My invention is not limited to the use of any particular type of non-linear resistors or current-distorting impedances, that is, devices having a variable volt-ampere characteristic, but satisfactory results may be obtained by utilizing for the purpose a resistor composed of a material having a variable resistance-ampere characteristic, for example, a material of the type disclosed in Letters Patent of the United States to Karl B. McEachron, assigned to the General Electric Company, No. 1,822,742, granted September 8, 1931, for Discharge devices and resistance material. The resistance employed may be a mixture of silicon carbide and carbon with a suitable binder or silicon carbide mixed with other conducting materials such as tungsten, molybdenum or the like. It will be understood, however, that any material having a variable volt-ampere characteristic may be employed, preferably one in which the resistance falls with increase in current. The resistor units 21 and 22 have symmetrical characteristics, i. e., they have no unidirectional property or rectifying tendency per se. The resistor units 21 and 22, as illustrated in Fig. 2, may also each consist of a pair of non-symmetrical devices such as copper-oxide rectifiers connected in parallel with terminals of opposite polarity connected so as to destroy the rectifying effects of the rectifiers and produce symmetrical resistor units.

It will be observed that the direct current instrument 23 is connected in a common portion of two alternating current circuits, each consisting of a source of applied voltage and two current-distorting impedances in series. However, only one such circuit is necessary and the principle of operation may be explained for the circuit consisting of the upper half of the voltage supply winding 19, the non-linear resistor unit 21, the alternating-current reactance winding 12 and the direct current instrument 23 in series. The input winding 14 polarizes the core 11 in proportion to the magnitude of input current.

The non-linear resistor unit 21 alone constitutes a current-distorting impedance which peaks the wave form of the current but does not introduce lack of symmetry in the wave form if a symmetrical-wave voltage is applied thereto. The reactance winding 12, however, itself constitutes a current-distorting impedance which not only distorts the wave form of the current, that is, gives it the different wave shape from that of the applied voltage, but also causes the current wave shape to become asymmetrical when a symmetrical voltage is applied.

The current distortion by the non-linear resistor unit 21 without introduction of asymmetry is caused by the fact that the resistance of the resistor decreases with an increase in current, so that the current therein tends to increase more rapidly than the voltage applied. As a result, even with a sinusoidal applied voltage the current is distorted in wave shape and various odd harmonics are introduced into the current.

The reason for the distortion in wave shape will be apparent upon consideration of the nature of the material constituting the resistor 21. As explained in the McEachron Patent No. 1,822,742, hereinbefore mentioned, by a suitable variation in composition and manufacturing procedure, certain resistance-ampere characteristics may be obtained. In the example given on page 4, line 81 et seq. of the McEachron patent, a resistance material is obtained satisfying the equation:

$$RI^{.73}=C$$

where

R is the resistance in ohms
I is the current in amperes
C is a constant

From Ohm's law $$R=\frac{E}{I}$$

where
E is the E. M. F. in volts.

The first equation may, therefore, be written:

$$I=KE^{\frac{1}{1-.73}}=KE^{3.7}$$

The last equation is represented graphically by the curve 28 in Fig. 5, in which current is plotted along the vertical axis and voltage along the horizontal axis. The curve 29 represents a sinusoidal voltage wave with voltage values measured in a direction parallel to the horizontal axis as in the case of the curve 28 and with time measured along the vertical axis. The current wave is represented by the curve 30 in which current values are measured in a direction parallel to the vertical axis and the horizontal axis is the time aixs. The corresponding values of voltage and current for the two waves 29 and 30 are obtained from the curve 28 by projecting construction lines such as the lines 31 from a point in one wave parallel to its time axis to the point of intersection 33 with the curve 28 and carrying construction lines 32 parallel to the time axis of the second wave from the point of intersection 33 with the curve 28.

It is to be understood that the curves of Fig. 5 are drawn on the assumption that sinusoidal voltage is applied directly to the non-linear resistor 21. The strength of the voltage supplied by the transformer secondary winding 19 is so chosen, however, as to bring the material of the core 11 into the saturable portion of its characteristic curve during one half-cycle in consequence of the unidirectional magnetization of the core 11 by the input winding 14. Consequently, the core 11 is not symmetrically saturated during the alternating current cycle. Inasmuch as the impedance 12 is an unsymmetrically saturated reactor, it has unsymmetrical impedance and current waves, indicative of the presence of even harmonics. The action of the impedance 12 in introducing even harmonic currents and avoiding odd harmonic currents is represented in Fig. 6. The curve 34 represents a true sine wave and the curve 35 represents schematically, but not accurately, the current which would be drawn by the reactor 12 if it were connected directly across an alternating current line with a sine wave voltage when the core 11 is polarized. The arrow M represents the direction of the unidirectional magnetomotive force of the input winding 14. Since the alternating current tends to increase the saturation of the core 11 during positive half cycles, the induced or counter-electromotive force and the impedance of the coil 12 necessarily become less the greater the current. Likewise during negative half cycles, the alternating current tends to decrease the saturation of the core 11 and the induced or counter-electromotive force and the impedance of the coil become greater the greater the current. Since the impedance varies in this way whenever the applied voltage is substantially sinusoidal, it is only natural that the current wave 35 should become more peaked than a true sine wave during positive half cycles and that it should become flatter than a true sine wave during negative half cycles. It can be shown that such a wave may be resolved into a fundamental frequency wave and a plurality of odd and even harmonics of which only the fifth, 36, and the second, 37, are shown by way of example to avoid confusion in the drawings.

The actual alternating-current electrical circuit of Fig. 1, however, consists of two different kinds of current-distorting impedances in series. The back electromotive force of the reactance coil 12 is very much less during the half cycle when the alternating current acts in the same direction in the exciting coil 12 as in the input coil 14, than during the half cycle when the currents in the coils 12 and 14 are acting in opposition. The back E. M. F. is thus asymmetrical, although it may be without a unidirectional component, i. e. have an average value of zero. The balance of the voltage available in the circuit which is impressed on the non-linear resistance unit 21 is also asymmetrical and reaches a higher peak during one half cycle than the other. In consequence the peaking effect of the resistance unit 21 is relatively marked during the one half cycle and negligible during the other. The average value of the wave during one half cycle is no longer equal to its average value during the other half of the wave. This has the consequence of introducing a direct current component in the current passing through the resistor unit 21 and the direct current instrument 23. The resistor unit 22 has a similar effect and the direct current components of the two alternating current branch circuits are additive in the direct-current instrument 23. The fundamental of the excitation frequency supplied by the source 18 as well as harmonics are by-passed by the condenser 25, and in any event have no effect on the direct current instrument 23.

Variations in the current flowing in the winding 14, varying the polarization of the core 11, vary the asymmetrical effect and thus cause variations in the current carried by the current responsive device 23, which therefore serves as an indicator of variation of current flowing in the input winding 14.

In the arrangement described the symmetrical characteristic non-linear impedance units 21 and 22 take the form of resistors. However, symmetrical current-distorting impedances which have the effect of producing a peaked current with application of a sinusoidal wave may also be produced in the form of reactors with saturable cores. They are either shielded or so protected as to minimize polarization.

In a circuit such as that illustrated in Fig. 1 where the elements 12, 13, 21 and 22 are separate elements, I find that the greatest sensitivity is apparently produced when the voltage drops in the symmetrical and unsymmetrical impedance portions of the circuit are substantially of the same order of magnitude. However, exact equality in these voltage drops is not essential to adequate sensitivity. Inasmuch as variations in the phase relationship between the even harmonic and fundamental portions of the composite alternating-current wave change the shape of the resultant wave and thus change the nature of the asymmetry of the resultant wave, I believe that the most advantageous arrangement is the one in which the symmetrical current distorting impedance units 21 and 22 are resistors and the unsymmetrical current distorting impedances 12 and 13 are reactances. Consequently, I believe that the most effective design with regard to distribution of voltage drops between the elements 12 and 13 and 21 and 22 will depend upon the ratios of resistance to reactance in the various impedances of the circuits.

It is to be understood that the rectifying effect comes from the conjoint action of the symmetrical and unsymmetrical impedance elements. However, my invention is not limited to the precise arrangement illustrated in Fig. 1 in which the various elements 12, 13, 14, 21 and 22 constitute separate physically distinguishable circuit elements. One or more of the elements for producing the conjointly operative effects may be combined into a single unit in the actual apparatus. For example, in Fig. 2 the current distorting impedance coil or exciting coil 12 and the polarizing coil or input coil 14 have been combined into a single coil 12' serving to perform the functions of both elements 12 and 14 of Fig. 1. This is accomplished by connecting the input voltage or current in the circuit of the coil 12' instead of in an independent circuit. The input 15 may be applied across a part of a resistor 16 in circuit with the coil 12' or across all or part of the coil 12'. The operation of the apparatus of Fig. 2 is otherwise the same as that of the apparatus of Fig. 1, a separate direct current being superimposed on the currents flowing in the circuit of the resistor unit 21 of Fig. 1.

My invention is not of course limited to supplying a separate current source for producing the polarizing action as such a unidirectional current may be provided by the rectifying action of the alternating current circuits with the symmetrical and unsymmetrical current distorting impedances. One example of this is a feed-back arrangement such as will be discussed hereinafter.

The invention is not of course limited to the connection of the current responsive instrument 23 directly in the circuit of the symmetrical and unsymmetrical impedances. The connection may be made through the interposition of one or more stages of amplifiers as represented in Fig. 2 where an amplifier 38 is provided with its input terminals connected across the by-pass condenser 25 and its output terminals connected to the current responsive instrument 23. The amplifier 38 must, however, be an amplifier suitable for use with direct currents, preferably arranged to be unaffected by stray magnetic fields. Consequently where it is desired to amplify with stability a minute direct current produced in a low impedance circuit, I provide a direct current amplifier which may consist of one or more stages each taking the form of electromagnetic induction elements as illustrated in Figs. 3, 4 and 7. The basic elements of the amplifier are a symmetrical current-distorting impedance, an asymmetrical current-distorting impedance with polarizing means, a source of alternating current excitation and output terminals in the a-c exciting circuit at which an amplified direct current appears, the polarization being made proportional to the direct-current input or the instantaneous value of the low frequency alternating-current input.

As illustrated in Figs. 3 and 4, a single stage amplifier, or each stage of a multistage amplifier, in one form of my invention, may comprise a unit including a pair of magnetic cores 39 and 40 such as toroidal or hollow-rectangle cores providing closed magnetic circuits with an input winding 41 linking both cores by surrounding the adjacent core legs, and with two exciting windings 42 and 43 each linking one of the cores and being mounted on one of the outer limbs thereof. The exciting windings are thus arranged to cause alternating flux to pass through the core material of the input winding for keeping residual magnetization at a low value by demagnetizing the core material each half cycle. Furthermore, the arrangement permits the flux produced by the input winding 41 to have substantially identical effects in alternate half cycles on the resultant flux in each outer leg of the cores. The exact arrangement described is not, however, essential and one of the exciting windings with the core it links may be omitted if a lower degree of amplification is adequate. Any suitable arrangement for polarizing the core material in proportion to the magnitude to be amplified may be employed.

In the amplifier stage illustrated in Fig. 4, represented schematically in Fig. 3, two identical units such as just described are placed side by side and oriented in such a manner that the effects of external fields will be opposite the two such units. This assembly referred to as astatic, minimizes the errors due to external fields and this minimizes the amplifier shielding requirements. The astatic arrangement thus makes the apparatus relatively free from variations which might otherwise result from change in position or mounting angle of the amplifier units and makes the apparatus suitable for portable use. As illustrated there is a second pair of cores 44A and 44B with an input winding 45, corresponding to the input winding 41, and with exciting windings 46 and 47, corresponding to the exciting windings 42 and 43. The coils 41, 42 and 43 are so connected with respect to the coils 45, 46, and 47, respectively, that the fluxes produced by corresponding windings flow in opposite directions in the core legs with respect to the earth's magnetic field. Since the two corresponding pairs of cores 39, 40 and 44A, 44B are placed side by side, any stray magnetic effect acting upon one will be substantially compensated by the same effect oppositely acting on the other. As a further safeguard the wound pair of three-legged cores may be enclosed in a shielding casing or core (not shown) composed of permeable magnetic material. Corresponding coils of the two cores are connected in series as shown. For simplicity in the drawings electrical windings in the form of concentrated coils are diagrammatically illustrated. However, distributed windings may be employed, which will reduce the tendency for leakage flux. Alternating current excitation is provided by a suitable alternating current source represented, for example, by a transformer secondary winding 48 having a mid point 49 connected to one of the output terminals 50. A pair of symmetrical current distorting impedances 51 and 52 is provided which may be of the same material as the non-linear resistor units 21 and 22 described in connection with Fig. 1. Two conjugate alternating current circuits are provided, one from the output terminal 50 to the transformer secondary mid point 49 through one end of the transformer winding 48 to the symmetrical current distorting impedance 52 through the alternating current coils 43 and 47 and through a conductor 54 to a second direct current output terminal 51'. An alternating-current by-pass condenser 55 may be connected between the output terminals 50 and 51'. The direct current or polarizing windings 41 and 45 are connected in series between a pair of direct current input terminals 56 and 57.

The polarizing flux produced by the direct current input causes a second harmonic of the alternating exciting current to appear in the alternating-current winding. The super position of the fundamental and second and higher even harmonic voltages results in an asymmetrical voltage wave which when impressed on the non-linear symmetrical impedances such as the resistors 51 and 52 results in a partially rectified current wave in the circuit connected to the output terminals 50. This circuit has two alternative paths, one the condenser 55 for the alternating current component and the other a direct current device which may be connected across the terminals 50 and 51. The direct current device connected across the output terminals 50 and 51' may be a low impedance device such as a D'Arsenval type of direct current indicating instrument, or it may be the input circuit of a subsequent amplifier stage as illustrated in Fig. 8 where four stages of amplification are provided. The amplifier stages may be similar in construction and design as illustrated, although successive stages should be designed for successively larger input currents in order to have the widest range of useful input currents without producing excessive saturation effects in some stages.

My amplifier circuit has been employed successfully in the detection, amplification and measurement of currents of the order of $1/100$ microampere, and I believe that it is well adapted to the measurements of currents of even smaller orders of magnitude such as less than $1/1000$ microamperes. Furthermore, I have found that my apparatus operates with a high degree of stability. My amplifier is inherently more stable than an electronic amplifier because it is not subject to errors of the electronic amplifier such as grid emission due to temperature, positive ions given off by the filament, photo emission of the grid due to filament light, grid emission due to low-voltage plate X-rays, an insulation leakage.

My invention is not limited to employment of apparatus elements of any particular core arrangement or to particular currents, voltages or excitation frequencies. However, I have found that satisfactory results may be obtained where the core material of the amplifier is laminated and composed either of an alloy such as that known by the trade name "Mu Metal" or one such as that known by the trade name of "Permalloy." If desired, the cores may be built up of interleaved straight or L-shaped strip laminations with each outside core leg, 3 to 4 inches in length and about one-fourth by one-tenth inch in cross-section with 12,500 turns in the direct current coils, 5,000 turns in the alternating current coils with a 500-cycle alternating-current supply at a voltage of approximately 33 volts at the transformer secondary windings. Such an arrangement gives an amplification of approximately 13 times per stage or a total of the order of 30,000 in a four-stage amplifier. It is well adapted for operation with low input and output impedances. The input impedance may be made 1,000 ohms or less which would present difficulties for amplification with a thermionic discharge tube circuit. Satisfactory results have been obtained also at relatively low frequencies such as the commercial 60 cycles. The invention is useful for both relatively high and relatively low current work. Owing to the effectiveness of my amplifier for the measurement of minute direct currents, it opens up a field of accurate and convenient measurement of thermoelectric, photoelectric and ionization current measurements. Furthermore, by its use many sensitive galvanometer applications may be replaced by sturdy indicating instruments. Such a device, for example, has long been sought in the measurement of the ionizing currents of the primary X-ray beam in deep therapy equipment. Another useful application of my amplifier is for enabling the operation of control circuits by low output devices such as blocking-layer light-sensitive cells.

Owing to the high degree of amplification there is a possibility of production of a residual current at the output terminals when the voltage input at the input terminals 56 and 57 is zero unless perfection is attained in the manufacturing operations with regard to balancing the cores and coils of the electromagnetic induction units and matching the non-linear resistance units. Some form of zero-setting adjustment is therefore desirable for reducing the output current to zero when the input current and voltage are zero. Accordingly, as illustrated in Fig. 8, I provide a zero-setting adjustment by the injection of a fixed polarizing current in a suitable portion of the amplifier. In order to avoid interference with the input circuit, it is preferable to avoid introduction of zero correction current in the input circuit. I have found that a satisfactory adjustment of the zero of the amplifier may be obtained without interaction upon the input circuit and without the necessity of handling large currents or voltages, by opening the circuit between the output terminals 50 and 51' of the first stage and the input or polarizing coils 60 and 61 of the second stage of the amplifier and introducing a suitable element for the injection of an adjustable reversible potential difference. For example, I may provide a potentiometer 62 connected across a direct current source 63. In order to make the injected voltage reversible, a fixed connection may be made to an intermediate point 64 of the potentiometer 62 from a point such as the point 51 of the amplifier, and a slidable tap or contact 65 may be provided which is connected to a conductor 66 in series with the input coils 60 and 61 of the second stage. The zero adjustment of the amplifier is made by short circuiting the input terminals 56 and 57 and sliding the tap 65 of the zero adjusting potentiometer in one direction or the other until a zero reading for the system is obtained.

In the modification illustrated in Fig. 7 a pair of open cores 69 and 70 is utilized which may be in the form of straight rods or bundles of straight circular wires. The cores 69 and 70 may be made relatively long to minimize any tendency for responsiveness to transverse magnetic fields and are wound with exciting windings 71 and 72 respectively corresponding to windings 42 and 43 of Fig. 3. A single input winding 73 is provided which surrounds both of the cores 69 and 70. Non-linear resistance elements 51 and 52 are employed as in the arrangement of Fig. 3 and the electrical circuit arrangement corresponds to that of Fig. 3. Since the cores 69 and 70 in the arrangement of Fig. 7 are responsive to longitudinal magnetic fields, the coils and cores are preferably enclosed within a shield or casing 74 composed of relatively permeable magnetic material. If the apparatus is to be utilized for sensitive work in which the field produced by the input winding is of the order of magnitude of external fields which may be present, it is to be observed, however, that since the exciting windings 71 and 72 are oppositely wound with respect to the effect of the input winding 73, there is a tendency for external fields to be neutralized.

If desired the output of any stage of the amplifier may be fed back to the input of the same or any preceding stage of the amplifier. Preferably a separate feed-back winding is employed to avoid undesired interaction between circuits. In Fig. 9 I have illustrated a feed-back connection embodied in an amplifier which is shown in a simple form for the sake of clarity. A portion of the output current or voltage affecting the output circuit; in this case the instrument 23, is fed back to a feed-back winding 75, which is shown as a separate coil linking the core 11. For example, a resistor 76 with an adjustable tap 77 may be connected in series or shunt with the instrument 23 in a circuit which shunts the by-pass condenser 25. The feed-back winding 75 is connected between one end of the resistor 76 and the tap 77, which permits an adjustable feed-back to be provided. For negative feed-back stabilization the winding 75 is so connected as to oppose the input winding 14.

Whether or not a feed-back connection is employed the sensitivity of the amplifier may be increased, if desired, by making the reluctance of the magnetic flux path low for alternating flux of second harmonic frequency. However, for maximum amplification it is advantageous to design the circuit of the direct-current input coil 14 with sufficient inductive reactance to maintain harmonic currents at a minimum in this circuit.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States, is:

1. A direct-current amplifier comprising a core comprising saturable magnetic material, an alternating-current coil in inductive relationship thereto, a direct-current coil also in inductive relationship thereto and adapted to carry a direct current which is to be amplified, means for energizing the alternating-current coil, a symmetrical type current distorting impedance without unidirectional properties per se, and a direct-current responsive device connected in series with said alternating-current coil, its energizing means, and the current-distorting impedance, whereby the polarized alternating-current reactance coil and the current-distorting impedance acting in conjunction produce a rectifying effect and cause a direct-current component of current in the alternating current circuit to appear in the direct-current responsive device having a greater amplitude than the direct-current input.

2. Apparatus of the type set forth in claim 1 wherein the current distorting impedances consist of non-linear resistance material.

3. In combination, an alternating-current supply winding having end terminals and a mid terminal, saturable magnetic core means providing parallel magnetic circuits, a direct-current input winding in inductive relation to said core means so as to link the parallel magnetic circuits, alternating-current windings in inductive relation to said core means, each connected between the mid terminal of said alternating current supply winding and one of the end terminals with such polarity as to act in opposition with respect to the magnetic circuit through the direct-current winding, a direct-current responsive device connected in series with the connection to the mid terminal of said alternating current supply winding, and current-distorting impedances of the symmetrical type each connected in series with one of the connections to the end terminals of said alternating-current supply winding.

4. A pair of magnetic cores comprising saturable magnetic material, each carrying a direct-current input winding, said cores being so mounted that the direct-current windings have the opposite effect with relation to the earth's magnetic field, alternating current windings in inductive relationship to said cores and also arranged to have the opposite effect with respect to the earth's field or stray magnetic field, energizing means for said alternating current windings, a current distorting impedance of the symmetrical type, and a direct-current responsive device connected in serial relationship to the energizing means for the alternating current windings, said cores and windings being substantially balanced, whereby the current of the direct-current windings is reproduced as a direct-current component in the alternating current circuit without errors produced by changing the position of the cores with respect to the earth's magnetic field or with respect to apparatus producing stray magnetic fields.

5. A multistage direct-current amplifier comprising a plurality of stages of amplifiers of the type set forth in claim 1 connected in tandem with the direct-current output terminals of one amplifier connected in series with the direct-current input winding of the next stage amplifier unit, whereby the direct-current input winding of any stage except the first serves as the "direct-current responsive device" of the preceding stage, a zero-set voltage injector being interposed in the output connection between one of the amplifier units and the direct-current input winding of the next stage amplifier unit, said injector consisting of means for providing an adjustable potential difference.

HENDRIK D. MIDDEL.